US010954149B2

(12) United States Patent
Kumar et al.

(10) Patent No.: US 10,954,149 B2
(45) Date of Patent: Mar. 23, 2021

(54) PROCESS FOR BIO-SLUDGE REDUCTION IN HYDROCARBON REFINERY EFFLUENT TREATMENT PLANT THROUGH MICROBIAL INTERVENTIONS

(71) Applicant: INDIAN OIL CORPORATION LIMITED, Mumbai (IN)

(72) Inventors: Manoj Kumar, Faridabad (IN); Prakash Chandra Sahoo, Faridabad (IN); Sandipam Srikanth, Faridabad (IN); Suresh Kumar Puri, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 16/563,508

(22) Filed: Sep. 6, 2019

(65) Prior Publication Data

US 2020/0102236 A1 Apr. 2, 2020

(30) Foreign Application Priority Data

Sep. 7, 2018 (IN) .............................. 201821033799

(51) Int. Cl.
| C02F 3/34 | (2006.01) |
| C02F 3/00 | (2006.01) |
| C02F 11/02 | (2006.01) |
| C02F 101/32 | (2006.01) |
| C02F 103/36 | (2006.01) |

(52) U.S. Cl.
CPC .............. *C02F 3/341* (2013.01); *C02F 3/006* (2013.01); *C02F 11/02* (2013.01); *C02F 2101/32* (2013.01); *C02F 2103/365* (2013.01)

(58) Field of Classification Search
None
See application file for complete search history.

(56) References Cited

U.S. PATENT DOCUMENTS

| 4,288,545 A * | 9/1981 | Spraker .................. C12R 1/385 |
| | | 435/42 |
| 5,989,428 A | 11/1999 | Goronszy |
| 6,916,427 B2 | 7/2005 | Roth |
| 9,475,714 B2 | 10/2016 | Amir et al. |
| 2008/0047903 A1 | 2/2008 | Morse |
| 2008/0308493 A1 | 12/2008 | Amir et al. |

FOREIGN PATENT DOCUMENTS

WO 2008128032 A2 10/2008

\* cited by examiner

*Primary Examiner* — Anand U Desai
(74) *Attorney, Agent, or Firm* — Maschoff Brennan (57) ABSTRACT

A process for treatment of hydrocarbon refinery wastewater producing a low bio-sludge, the process including utilizing microbial consortia comprising at least one species of *Pseudomonas* and at least one species of *Bacillus* in a ratio of 10:1 to 1:10. The species of *Pseudomonas* and species of *Bacillus* have constitutive expression of at least one hydrocarbon degrading gene. The species of *Pseudomonas* are selected from the group consisting of *Pseudomonas stutzeri* (MTCC 25027), *Pseudomonas aeruginosa* (MTCC 5389), *Pseudomonas aeruginosa* strain IOC DHT (MTCC, 5385), *Pseudomonas putida* IOCR1 (MTCC 5387), *Pseudomonas putida* IOC5a1 (MTCC 5388) and a mutant thereof. The species of *Bacillus* are selected from the group consisting of *Bacillus subtilis* (MTCC 25026), *Bacillus substilis* (MTCC 5386), *Bacillus thermoleovorans* (MTCC 25023), *Bacillus stearothermophilus* (MTCC 25030), *Lysinibacillus* sp. (MTCC 25029), *Lysinibacillus* sp. (MTCC 5666) and a mutant thereof. The microbial consortia is used in concentration of at least $10^2$ cfu/ml.

5 Claims, 1 Drawing Sheet

Specification includes a Sequence Listing.

SEQUENCE LISTING

```
<160> NUMBER OF SEQ ID NOS: 15

<210> SEQ ID NO 1
<211> LENGTH: 498
<212> TYPE: DNA
<213> ORGANISM: Unknown
<220> FEATURE:
<223> OTHER INFORMATION: Gene producing a Lichenan specific enzyme

<400> SEQUENCE: 1
tcaagcggaa gcgataagcc tttgccttcc ttgtttgata agctttctt tcattgacca    60 tagatgataa aaatagtctg tctgctcgtc cttgtctttt gctaaaaggt cgctgtactc   120
tgtttttgaa aagaagcgct tggcgatctc aaggctgatc ggtttcgttt tttcgatatc   180
tatgccgatc ggctgtgaat caaacgcgca aatgacccag cgtccggagt gagaaatgtt   240
gaaatgagcg tcgggaagat cagggatgca cggcttcccg tattcctgcg tgctaaagcg   300
gatatcggat ttgtccaact gatactgcct gcttatgact gagcgaacga gcacatctcc   360
cagcagggtg cggtgagcat cttctttatg ataaaatctc cggcatttct cccgttttc    420 aggtgatatg aaagacatga accgttcatt ttcttcctgt gaaagcgggc ggtccatata   480
aattccgtaa atcttcat                                                  498

<210> SEQ ID NO 2
<211> LENGTH: 729
<212> TYPE: DNA
<213> ORGANISM: Unknown
<220> FEATURE:
<223> OTHER INFORMATION: Gene producing phosphopantethenyl transferase

<400> SEQUENCE: 2
atgagccaac tcttcaaatc atttgatgcg tcggaaaaaa cacagctcat ctgttttccg    60
tttgccggcg gctattcggc gtcgtttcgc cctctccatg cttttttgca gggggagtgc   120
gagatgctcg ctgccgagcc gccgggacac ggcacgaatc aaacgtcagc cattgaggat   180
ctcgaagagc tgacggattt gtacaagcaa gaactgaacc ttcgccctga tcggccgttt   240
gtgctgttcg gacacagtat gggcggaatg atcaccttca ggctggcgca aaagcttgag   300
cgtgaaggca tcttttccgca ggcggttatc atttctgcaa tccagccgcc tcatattcag   360
cggaagaaag tgtcccacct gcctgatgat cagtttctcg atcatattat ccaattaggc   420
ggaatgcccg cagagcttgt tgaaaataag gaggtcatgt cctttttcct gccttctttc   480
cgatcagatt accgggctct tgaacaattt gagctttacg atctggccca gatccagtcg   540
cctgttcatg tcttttaacgg gcttgatgat aaaaaatgca tacgagatgc ggaagggtgg   600
aagaagtggg caaaagacat cacattccat caatttgacg gcgggcacat gttcctgctg   660
```

| | |
|---|---|
| tcacaaacgg aagaagtcgc agaacggatt tttgcgatct tgaatcagca tccgatcatt | 720 |
| caaccgtga | 729 |

<210> SEQ ID NO 3
<211> LENGTH: 888
<212> TYPE: DNA
<213> ORGANISM: Unknown
<220> FEATURE:
<223> OTHER INFORMATION: Gene producing rhamnosyl transferase

<400> SEQUENCE: 3

| | |
|---|---|
| tcaggcgtag ccgatggcca tctcgtggaa tcccgccgcg cgttccgccc gctgcggctc | 60 |
| cggttgcttc agcaggtgct cgagcagggc gcggtgcacg cgtaccgctg ccagcttgga | 120 |
| ctccaggtcg aggaaatgcc cggtgccctc cacccgcgag aaactgcagt gcggcaggta | 180 |
| gtcgcggaac tggcgggcgt cctcggcggt ggtgtattcg tcccagctgc cgttgatgaa | 240 |
| atgcacgtgg ctctggatcc gctccaggca agccaagtag ccccgatcgt tgagcgccag | 300 |
| cacctggtcg atgtgaaagc gcgcctgctc gtattcgccg gtggccagcg aagccatgtg | 360 |
| ctgatggttg ctggctttca ggcgctgcgg caggtatttg ccgacggtct cgttgagcag | 420 |
| atggccgatc gccgacttgt cgtccagctc gatcagcgcc tgcgcccgcc cgacgtagtc | 480 |
| gagcatcgcc tggttcagtc caggggcgaa tgccatcacc accgagctgc ggatgccgcg | 540 |
| cggattgcgc gacagcgcca gcagcgtgga gataccgccc caggacgcgg agaccaggtg | 600 |
| attgacctcg aagcgctcga tcagcgccag gaggatttcc acctcgtcgt ccttggtgat | 660 |
| caacccgcgc tgcgggttgt gctgacgcga ctgcccggcg aagggcaggt cgaacagcac | 720 |
| cacgttgaaa tgttcggcca ggcacttgca ggtccgggcg aacgaggcgg tggtcgccat | 780 |
| cgcgccgttg accagcatca ccgtgctgcg cccgggatcc tgcccaacgc gctcgacatg | 840 |
| tacccgcagg cccttgcaaa ccgataccaa cagactttcg cgccgcat | 888 |

<210> SEQ ID NO 4
<211> LENGTH: 978
<212> TYPE: DNA
<213> ORGANISM: Unknown
<220> FEATURE:
<223> OTHER INFORMATION: Gene producing surfactin synthetase complex

<400> SEQUENCE: 4

| | |
|---|---|
| ctaggccttg gccttgccgg aagctacgga cgccacggcc gggccggcga ggcgcttcag | 60 |
| caggcgcggg cggttggtct ccagcgcgcc gccgcgtccc gcaggccgt cccacaggcc | 120 |
| ccagcccagg cagcgcagct tgagcagctt gtcgcgttcg agcaggagca ccgcgaggcc | 180 |
| ctgggtcagg gtcggcaggt tcgccagcag ggccagcggc gaggaccggg cgtagcggcg | 240 |
| caggaccagc aggccgttgc gcgccaggta gtagcggcgc agcggggcgt ggttcatcgc | 300 |
| gctgaggctg agaccgccga ggcggcgggt cttgcgcgtg ccgatgcggt gctcgaggac | 360 |
| cagccgcggg tcgacgtaca ggggcacgtc cagcgcctgg gcgcgcaggc tgtattcggt | 420 |
| gtccacgtgg tcgatgaaca gttcctcgtc gaagtggccg aggcgctggt aggcctcgcg | 480 |
| ggtcagcagg cagccggagg agatcaggaa cgaggtgcgc tgcggggtcg tcaggccgtc | 540 |
| cagagacaat tgcctgagcg tcagtccgtc gagatggatg gccggcagga agcgccggtc | 600 |
| accccggtcg aagatccgtg ggcgagcag gcaggcctga ccgttgcgcg cctgcaggtt | 660 |
| gcgccactgg gcggcgagga aggcgccgcc gggacgggag tcctggtcga gcagcagcac | 720 |
| accctgcacg ccacgccgga atagcgcgtc gagtccctgg ttgaaggcgc cggcgatgcc | 780 |

| ctgccggttg ccgtggtgca gcacggcgat gccttgcccg cgcagccggg cattgcgctg | 840 |
| cggatcgctg tgcggtgagt tgtcgacggc aaggaagcgc agttgcggaa acgccgccgc | 900 |
| cagttcgcca aggtgttcca ggtcgtcgtc gccaggattg aacagtacca ccagcacgcc | 960 |
| catgtctatc cggtccat | 978 |

<210> SEQ ID NO 5
<211> LENGTH: 891
<212> TYPE: DNA
<213> ORGANISM: Unknown
<220> FEATURE:
<223> OTHER INFORMATION: Gene producing catechol 1,2 dioxygenase

<400> SEQUENCE: 5

| atgaatactg attttgtgaa gactcaaccc gtccaaactc ttctcgaccg cgccagcggc | 60 |
| gtcgatgtgg agggcggcga ccgtcggctc aaggccatta cccgcgacct cgtcgaagcg | 120 |
| gtgatgacgg tcatcgtcaa gcatgacatc aacgaaagcg aattctggaa agcgatagac | 180 |
| tttttccaga agggcgccgg tgaattcggc ctgatcgtgc cgggcgttgg cctggaacat | 240 |
| ttccttgacc tctacatgga tgccaaggac gcggaagccg ggctgtcggg cggcacgccg | 300 |
| cgcaccattg aagggccgct ctatgtcgcg ggcgcgccgc tggtcgaagg tgacgtcaac | 360 |
| ctttccgacg acgcggacga taccggcacg ctgtacatgt ccggcaccgt caccggcccg | 420 |
| aatggtgagc ccgtcaccga tgccattctg catgtctggc acgccaattc gatgggttgg | 480 |
| tattcgcatt cgaccccac gcgcgagcag acgccgttca ataaccgccg ccggatcaag | 540 |
| ctcggcaagg acgggcgcta ttccttccat tcgaagatgc ccaatggcta cagcgtgccc | 600 |
| cccggcggcg cgaccgatca gctgatgaaa gccgtcggcc gtcacggcaa ccgtcctgcc | 660 |
| cacgtgcatt tcttcgtaga agcgccgggc tatcgcacgc tgacgacgca gatcaatttc | 720 |
| ggtgacgatc cgttcgcagc cgacgacttt gcgttcggca cccgcgaagg tctgctgcca | 780 |
| gtcccgaacc gtcagggcga caccgtccat atcgcgttcg acttccagtt gcagaagtct | 840 |
| gctgaggcaa cggatgaaag cttctccgct cgcagccgct tggccgtctg a | 891 |

<210> SEQ ID NO 6
<211> LENGTH: 933
<212> TYPE: DNA
<213> ORGANISM: Unknown
<220> FEATURE:
<223> OTHER INFORMATION: Gene producing naphthalene dioxygenase

<400> SEQUENCE: 6

| atgaccgtga agatttccca gactgccgac atccagaagt tcttcgaaga agccagtggc | 60 |
| gccctgaatg accagggcaa cccgcgcgtg aagaacctcg tcctgcgaat cctgcaggac | 120 |
| accgcgaaac tgatcgaaga catgaatgtt acgcccgacg aattctggaa ggcggtggac | 180 |
| tacctcaacc gccttggctc ccgtcaggag gccggcctgg tcgtcgccgg cctcggcgtc | 240 |
| gagcactacc tcgacctgct gctggacgcc caggacgcgc tgccggcct cggcggcggt | 300 |
| accccgcgca ccatcgaagg cccgctgtac gtggccggcg cgccgctgtc cgaaggcgaa | 360 |
| gcgcggatgg acgacggcaa ggatgcgggc accgtgatgt ttcttttccgg ccgcgtgttc | 420 |
| gacccgcagg gcaagccgct ggccggcgcg gtggtcgatc tctggcacgc caacacccag | 480 |
| ggcacctact cgtacttcga cagcacccag tccgagttca acctgcgccg ggcatcgtc | 540 |
| accgacgccg aagggcgcta ccaggcgcgc agcatcgtgc ccagtggcta cggctgtccg | 600 |
| ccggatggcc cgacccagga gttgctcgat cagctcggcc gccacggcca cgcccggcg | 660 |

```
cacatccact tcttcatctc cgcgccgggg catcgccacc tgaccacgca gatcaacctc    720
gccggcgacc agtacctgtg ggacgacttc gcctacgcca cccgcgacgg gctgatcggc    780
gaggtgcgtt tcgtcgaaga cgcagaggcc gcgaaggtgc gcggtgtgga agggcgtttc    840
gccgagatcg agttcgactt ccagttgcag caggcggttt ccgctgatgc cgaggaccgc    900
agcaaccgtc cccgcgcgct gcaggaagcc tga                                 933
```

<210> SEQ ID NO 7
<211> LENGTH: 1464
<212> TYPE: DNA
<213> ORGANISM: Unknown
<220> FEATURE:
<223> OTHER INFORMATION: Aromatic ring hydroxylating gene

<400> SEQUENCE: 7

```
ctaggcctcc tttgtgagga tttggtcggc cgggatggca gtgctcccga cggcggcccg     60
tgaaggatcc gcctcggcgg ccgcgggtgc ctgaatagga tcggttccga cgtgcagctg    120
ggccgctttc tccatcggtc ggtcgagtg atcagcccac cgcagcagga gttcacgctg    180
gttgtattcg ctatagccga cccgcgtgga acctggtcct gaatactcat ctgaggtcag    240
gggttctacg acgttctgcc cgttttccag catgcccatc cggctgttga gcaggaggcg    300
gcgggccata gggccgcccg ccgtgctcgt cagcgagacc cagttttcaa cgtcgtcttg    360
ttcaaacatg ccgccgctgc caaagcacat gagatatgcc ttgtacgaaa gggccttgaa    420
ctcctcagag gcgttcttgt ccacggcaaa ccacgaaacg atctcggtct cgtcttcgct    480
gatgggctgc cattggcgga tggagataaa cggcaggact tcgtcggagt cttcttctac    540
gcggggccag ttgtggacga agctcatgtt tgggaagacc gatgcggccg agaccatgaa    600
tccgtccttg cccacgacat cgagctgctc ctggctccat tgctccttca tccgcgcgat    660
catgtcgtcg gggtagccga catagcgaag ccgttcctcc aaggtgccct cgggaagctt    720
gtaggtggta ccgccgccgt tgccggccca gtaggttgtt ccatccttgc gcttctcagc    780
cttgggttcg cggaagagac cgatttcaac aactgacgtg tgcgtttggg gagtgtggta    840
catgtcgcca gcgaagtttt cggcgccgat cttccagttc gctttgaccc gccaccgctg    900
ggggccccgg agttcgatgc cgtcagcgct ttgcttcgtg tagtaatcca tgtagaactt    960
gaagtcgccc aggaagtcct cgaggggttc cgcgtcaggg tcaaggctga tgaaaatcag   1020
cccgttgtag gtgcccaagg acggggcggg cagcagggtc tgaccttttt tcttgaagcc   1080
ctcttcgccg ccgtaggctt ctttgtggaa cggcaggccc acgatgcgtc cgtcgttgcg   1140
gtaggaccag ccgtggtagg ggcagcgaa atgcgaggcg tttcccatct cggcccggca   1200
gacctgcatg ccccggtgga ggcacatgtt aaagagagca cggatctcgc ccttttcgtc   1260
tcgggaaatg atgaatgaat cttcgagtac tcggcgcact acgtagtcgc cggcttcggg   1320
cacctcggac tcgtgggcaa cgaagagcca actccgtccg aagaggcgct ccttttcgag   1380
ctcgaagatt tccttgtcgt tgtaaatgtg tgcaggaatc atgccgcgct gcacgtcctg   1440
gatgacgctg gtctggtctg tcat                                         1464
```

<210> SEQ ID NO 8
<211> LENGTH: 1290
<212> TYPE: DNA
<213> ORGANISM: Unknown
<220> FEATURE:
<223> OTHER INFORMATION: Aromatic ring hydroxylating gene

<400> SEQUENCE: 8

```
ttacttctcg gcgaccaggc gggcgtgggc ggattcctcg cccaggttgt tcagcagccg      60
ctcgctgtac cagtcgagga agttgatcac gccaaactcg taggtcttgg agtacggccc     120
cggctggtag gcggtggagt tgatcccgcg ctggttctct tcggccagcc ggcggtcctg     180
gtcgttggtg gcgtcccaca cttcgcgcag gcgcgccacg tcatagtcga cgccctccac     240
cgcgtccttg tgcaccagcc acttggtggt gaccacggtt tcctgggcgc tgatcggcca     300
cacggtgaag acgatcaggt ggtcgcccat gcagtggttc cacgagtgcg gcaggtgcag     360
gatgcgcatg gagcccaggt ccgggttctt gatgcgaccc atcagcttct tcgagccctg     420
cttgccgtcc atcgtcatgg acacggtgcc gtcgagcagc ggcatgcgca cgatgcggtt     480
gcgcaggccg aagctttcgt gggcgtaggg gatcttctcc tcgtcccagg ccctggtgca     540
ggcggcgacc tgatccttga acgcctgact ggcgcgcggg tcggtgacat cgtcccactc     600
cagcagggtc ttgagcagtt cggggtgcga gccgttgcag tggtagcact cgcggttgtt     660
ctcgagcacc agcttccagt tggccgcttc gcggatcgtg gtctgcaccg cgaccttggc     720
gttctccatg tcgtacggct ccatgtagtg ctcgagcgtc cgcaggaagt cgtcgatggc     780
cggcggattc tccgccagcg aaatgaagat gtagccgccg gcggtcttca cgttcaccgg     840
tttcaggctg tagtcctgca tgtcgaagtc ggcgcccatt tcggtgccgg cgaacagcag     900
gcggccgtcc agtcgtagg tccactggtg ataggggcag accagcttgg cgaccttgcc     960
cttgtcgctg acgcacaggc gcgagccacg gtggcggcag acgttgtgga aggcgtggat    1020
ctgcccttcc gcgccgcgca ggacgatgac cgggttgtcg ccgatctgca gggtgagaaa    1080
gctgcccttg gtcggaatct cgcaggtcat gccggcaatc agccactcct tgtggaagat    1140
ctcctgcatg tcgatctgga acaggcgctc gtcgttatag aagggctgcg gcagcgagaa    1200
gctgtggtcg cggctctgca gcatctcggc ggtggccttg cgggccggct ccagcggatc    1260
gcccagactc agggtagtgg tgacgtccat                                     1290
```

<210> SEQ ID NO 9
<211> LENGTH: 1167
<212> TYPE: DNA
<213> ORGANISM: Unknown
<220> FEATURE:
<223> OTHER INFORMATION: Gene producing alkane monooxygenase

<400> SEQUENCE: 9

```
tcacggcgcg ttcgcgatgg cgagctccgc gagcaccttt tgccggatcg acggcttgat      60
gttcgattgc gccatgtccg caccgtagtg cgcgacgacc cgcggattca tcaccctgaa     120
ccacagcggc ggcacgtacg cgagcaggat catcgccgcg tagccggccg gcagttgcgg     180
cgaatcgtcg aagtgccgca cgcctgata cgagcgcgtc ggattcgcat gatgatcggc     240
gtggcgttgc aactgataga ggaacagatt cgtcacgacg tggttgctat tccacgagtg     300
ctgcggcgtg cagcgctcgt agcgtccggt cggcaactgc ctgcggccga gcccgtaatg     360
ctcgacatag ttcacgacct cgagcagcga cgcgccgtat gccgcctgga tcagcaggaa     420
cggcaccacc ttcgcgccgc cgaacgcgat cgcggcgctc catagcgcga ccgtcatcgc     480
ccacgcctgc agcacctcgt tgcgccacga ccacgccgag cggccgctgc gcgcgaggcg     540
cgccttctcg agccgccatg cggacgcgat gctgcccgtc acggtgcgcg caggaacgc     600
ccagaacgat tcgccgtagc gcgcgctcgc gggatcgtcc ggcgtcgcca cgcgcacgtg     660
gtgcccgcga ttgtgctcga cgaagaagtg gccgtacgcg acgggcgcga gcgtgatctt     720
```

```
cgcgagccag cgctcgagcg ggctcgtctt gtggccgagc tcgtgcgcgg tgttgatcga    780
gatgccggtg gccgcgccga gcgagaacgc gaagccgagg tagtcgtacc acgcgagcgg    840
ctgcgtggcg acgatccaga tcgcgcccgc gaaggcgaca tagacgacga aggtcgccag    900
atagacgacg tagcggtagt agcgttcgct ttcgagccgg ggcccgatcg attcgggcgg    960
attctcgctg tcgacgccga tcagcaggtc gagcaccggg atgacgccga acgcgaagag   1020
cggcccgaac caccagaaca cgtgccagcc ggtcgacagc gcgaggagcg cggcgacgag   1080
cggcagcgtg atcgtcagtg cgccgagcag ccaccaatag cgtttcgtgt cggcccagtc   1140
ggccgacacc ggttgctgga ttgccat                                       1167
```

<210> SEQ ID NO 10
<211> LENGTH: 1149
<212> TYPE: DNA
<213> ORGANISM: Unknown
<220> FEATURE:
<223> OTHER INFORMATION: Gene producing alkane dioxygenase

<400> SEQUENCE: 10

```
tcaggaagct gccggccgct cgctctgttc ggccgtcaac tggaactctt cgcccgcata     60
gtaggcccgc accttggggt ccatgaccgc ccgccacagc ggcggatca gcgccagcac    120 caccatcccg gcataaccgc tgggcatctg cgggctatcg tcataatgac ggaggacctg    180
ataggggcgt ttggcgaagg catgatggtc ggaatgccgt tgcagatgga acaggaccag    240
gttggtgaag acgaagttgc tgttccagga gtgggtatgg ttggtccgct cgtagcgccc    300
gtcctcgccc tttcgccgat gcaggccgta gtgctcgacg tagttgatga tctccagcag    360
ggtcaccgcg acgaacgctt ggccaaggaa gaaaaccatc cccagccagc cgaacgccca    420
accgaaaccg accagcaacg ccaggctcag caggtaccac cagatcagtt cgttctgcca    480
gccgaacacc ggcaggccct tcttgcgcag ccgcaccgct tcaaggcgcc aggcgttgag    540
gaagttgtac ttgtaggcat gcggcaggaa ctggtagacc gactggccga aacgcgccga    600
cgaagcgtcc tccggcgtag acacatgcac atggtggccg cgcacatgct cgaccttgaa    660
ccccgcgtag cacacggcgg ccagcaggat gccgccggca gcctgctcca gcgccgagtc    720
cttgtggatc agctcatggg cgacgacgat ccccaccgct cccatcaccg tgcccatcga    780
gaggatccag cccaaccggc cgagccagcc ccactcctgg aaagcgacga acacgccagc    840
ggcccacacc agcgtaccga tgagcaccgg caccgtggcc agggtcagca atacgtaata    900
gccctggccg agcaactgcg gcgtctgggt ttcctcgtcg ggggttggccg ggtcgcggcc    960 gaacagcatg tccagcagcg gcccgatgcc gaataccgca atcaccaggg aaaatgccca   1020
gaaggccgga tgtgcgctgt cctgggccat ccagtagttg aacggcatgg acaacgccag   1080
cagcagccag agccaatagg cgtacttctt gatggccagc atggtgctgg agagaaatt    1140 ttcaaacat                                                           1149
```

<210> SEQ ID NO 11
<211> LENGTH: 1224
<212> TYPE: DNA
<213> ORGANISM: Unknown
<220> FEATURE:
<223> OTHER INFORMATION: Gene producing flavin-binding monooxygenase

<400> SEQUENCE: 11

```
atgaatgcac cagtaaatgt tcagcaagaa cttatgccag tgccagcgtc tatgcgtgag     60
atagatcgta agcgctattt atggatgatt agtccggctc tacctgtaat tggtttaggt    120
```

| | | |
|---|---|---|
| atttttagctg | gataccattt tggtccacgc ccattaaaga aagtatttgc tttaggtggc | 180 |
| ccactttttat | tacacgttgt gattcctgca attgatacaa ttattggtaa agatgcgcgt | 240 |
| aatccaaccg | atgaagaaat taaacttctt gagaaagatc catattattc gcgtttggta | 300 |
| aaaagttttta | ttccattgca gtatgcggca aatatttatg catgttattt aacaagccgt | 360 |
| aaagatactt | catttattga caaaattttg cttggtattt cgatgggtgc cattaatggt | 420 |
| attgcaatta | atacagccca tgaattaagc cataaacatg atcgtataga ccatattta | 480 |
| tctcatcttg | ctctggtgcc tacaggttac aaccatttcc gtattgagca tccatatggc | 540 |
| catcataagc | gtgcagcgac tcctgaagat ccggcatctt cacgtatggg tgaaacattc | 600 |
| tatgaatttt | ggccacgtac tgttatcggt tcttttaaat cagcaattga aattgagaaa | 660 |
| aatcgtttaa | aacgtaaagg taaagagttt tggtcactcg ataatgaatt gctgcaaggc | 720 |
| tggggtatga | gtgctgcttt ccatgcttct atggtaggaa tttttggtaa aggtacgatt | 780 |
| ccatatttgg | caacacaagc attttacggg attagcctat cgaaattat taactatatt | 840 |
| gaacattatg | gcttattgcg tcagaaaaaa ggaaatggcc aatatgaacg tacaatgcca | 900 |
| gagcatagct | ggaataataa caatgtagtg accaacttat tcttatatca gttacagcgt | 960 |
| cactcagatc | atcatgctta tccaactcgt ccattccaag cgttacgtca ttttgatgaa | 1020 |
| gcaccagagt | tgccaagtgg ctatgcaagt atgctgctac cagccatgat tccttcatgg | 1080 |
| tggtttaaaa | tgatggataa gcgtgtattt gatcactaca aaggggattt aaataaagca | 1140 |
| aatatttcac | caaaacgtcg tgcaaaaatc ttcaaaaaat ttggtgtagt cgataagtcc | 1200 |
| ttagaagcta | cacaggctga ataa | 1224 |

<210> SEQ ID NO 12
<211> LENGTH: 663
<212> TYPE: DNA
<213> ORGANISM: Unknown
<220> FEATURE:
<223> OTHER INFORMATION: Gene producing quinone oxidoreductase

<400> SEQUENCE: 12

| | | |
|---|---|---|
| atgtattcag | gatcgcaatc cggcggcacc gatcaggaac aaaacgtgtc gctgctggtg | 60 |
| gcgggcgatc | acgaattgct tcgggatgcc atcagcgaaa tcctgagacg ggagggaggg | 120 |
| ttctcggtag | aggtgaccgg cagccgcgaa ggggtgctca agcagatcga agaaagaggc | 180 |
| gggttcgacg | tcatcctgct cgatctgcag atgccgggca tgagcgggct cgattctctg | 240 |
| cgcgaagtag | cgacgtcaaa tgccaacgga gccgtagcga ttttagcggg cgagcttacg | 300 |
| cgcgatgtgg | tgatgagtgc cttcaaggca ggcgccagag gctatattcc gaaaacactc | 360 |
| ccgctgcgcg | ccttgcccat cgccttgcgc ctcatcgcct ccggtgagag ttacgttcct | 420 |
| gcgtggctga | caaatggagg cggaacaacg caggcggatg gccccagttt cgatcttctg | 480 |
| ccagaagagt | tgcagatcct ggaagaggtt tcggacgggc ggaccaacaa gcagatcgct | 540 |
| ttcacgctga | acgtgaccga aggtgccatc aagatgaaga tgcgcgccat ctgcatgaag | 600 |
| ctgggagcca | agaaccggac gcacgcggtg gtgatcgcgc ggcagcacat gatgctgcgg | 660 |
| tga | | 663 |

<210> SEQ ID NO 13
<211> LENGTH: 681
<212> TYPE: DNA
<213> ORGANISM: Unknown
<220> FEATURE:
<223> OTHER INFORMATION: Gene producing persulfide dioxygenase

<400> SEQUENCE: 13

```
atgggtaagc ccttgccgcg cgatcagctt gctaaaaacg tcgcagccac ggctgctgcc      60
ggtaacgttg caggcgcact ggatctgctc gtaacctatg ctggcgcctc gcattatttg     120
ctggcgcgag atgatcttct cgaagaaacc gggctgaaat tcatcgtcac atccgactgg     180
cctttcgatc tggtccgcag gctcggcatt gaactcacca acagccagaa ccggtcgagc     240
gaaatggaga gtgccttc gctgcttcag ccgcgattgc ttctccttcc cgacgatgtt       300
tccgtgccct atggcataga caggcaatat tcggcactct ccttttgtgt gggccgcatc     360
cgcctttccc ttttgctgct gtttccggaa gaagcggttc cgtcaccgga cgcgctgcgg     420
gaaatcgccc tgctgacggg gtattgcgtc agcttcggca tcgccagcga agcaaagacc     480
gtgcgcgata tcgatctcac cgagcgtgag ctcgagtgcc tgttctggat cgcggaaggc     540
aagacaagtg atgaaattgc gatgatcctt ggcatttcac gcaatacgat caataattac     600
atcacaagcg tgatgcgtaa aaccgcgaca aaaacccgct cggaggcaat tgcctacgcc     660
gtgcgcaaca acctcgtata a                                                681
```

<210> SEQ ID NO 14
<211> LENGTH: 591
<212> TYPE: DNA
<213> ORGANISM: Unknown
<220> FEATURE:
<223> OTHER INFORMATION: Gene producing catechol 2,3 dioxygenase

<400> SEQUENCE: 14

```
atgatcaccg ttgcccttat agacgatcac ctcatcgtcc gctccggctt tgcgcagctg      60
ctggggctgg aacctgattt gcaggtagtt gccgagtttg gttcggggcg cgaggcgctg     120
gcggggctgc cggggcgcgg tgtgcaggtg tgtatttgcg atatctccat gcccgatatc     180
tccggtctgg agctgctaag ccagctgccg aaaggtatgg cgacgattat gctctccgtt     240
cacgacagtc ctgcgctggt tgagcaggcg cttaacgcgg gggcacgcgg cttctcttcc     300
aaacgctgta gcccggatga actcattgct gcggtgcata cggttgccac gggcggctgt     360
tatctgacgc cggatattgc cattaaactg gcatccggtc gtcaggaccc gctgaccaaa     420
cgtgaacgcc aggtggcgga aaaactggcg caaggaatgg cggtgaaaga gattgccgcc     480
gaactgggct tgtcaccgaa aacggtacac gtccatcgcg ccaatctgat ggaaaaactg     540
ggcgtcagta acgacgtaga gctggcgcgc cgcatgtttt atggctggtg a              591
```

<210> SEQ ID NO 15
<211> LENGTH: 531
<212> TYPE: DNA
<213> ORGANISM: Unknown
<220> FEATURE:
<223> OTHER INFORMATION: Gene producing chromate reductase

<400> SEQUENCE: 15

```
atgtttctta taattaccag ggatacgatg ttcttcaccg cgatgaaaaa cattctgagt      60
aaaggtaatg tcgttcatat acagaacgaa gaagagatcg acgtaatgtt gcatcagaat     120
gccttcgtca ttattgatac attaatgaat aatgtatttc attctaattt tctcactcaa     180
attgaacgat taaaacctgt ccatgtcatt attttctccc cctttaatat taaacgctgc     240
ctggggaaag tgccggtgac ctttgttccg cggactatca ctatcattga ttttgtcgca     300
ctcatcaatg gcagttactg ctctgtgcct gaagcggctg tgtcactttc gcgcaagcaa     360
catcaggttc tgagctgcat tgcgaatcaa atgacaacgg aagatattct ggagaaactg     420
```

```
aaaatatcgc taaaaacgtt ctactgccat aaacacaata tcatgatgat cctcaatctt    480
aagcggatca atgagctggt acgccatcag catattgatt atctggtgtg a             531
```

PROCESS FOR BIO-SLUDGE REDUCTION IN HYDROCARBON REFINERY EFFLUENT TREATMENT PLANT THROUGH MICROBIAL INTERVENTIONS

FIELD OF THE INVENTION

The present invention relates to hydrocarbon refinery wastewater bio-treatment and more specifically to a process for bio-sludge reduction in effluent treatment plant (ETP) aeration tank through microbial intervention.

The sequence listing disclosed herein is included in a text file having the name "I1609-10083US01_Sequence_Listing," created on Dec. 18, 2019, having a size of 20,585 bytes. The foregoing text file is incorporated herein by reference.

BACKGROUND OF THE INVENTION

Wastewater is produced as a by-product in various processes like desalting, cooling towers, storm water, distillation, or cracking in oil refineries and petrochemical plants. In order to re-use the wastewater in a typical petroleum processing industry, it is treated in an Effluent Treatment Plant (ETP) by various physico-chemical methods in which the economically recoverable products like hydrocarbons are recovered and the pollutants are treated in biological units by microbial action. The unrecoverable oil and grease and other organic contaminants are reduced by microbial catabolism in aeration chambers by activated sludge process. The extent of degradation depends on the presence of a required catabolic gene pool, the type and functionality of the microorganisms in the microbial community and their number.

The majority of the wastewater biological treatment is done by using the "activated sludge" process. In all activated sludge plants, once the industrial wastewater has received sufficient treatment, an additional step of settling out the biological floc is required. Part of the settled material, the sludge (biomass), is returned to the system to re-seed the new industrial wastewater entering the tank. The remaining sludge then needs to be disposed of. The bio-sludge contains biomass, hydrocarbons, metals and other hazardous materials, hence, need to be disposed safely.

The biological treatment of industrial wastewater by activated sludge process is often disrupted by seasonal variation and shock load from organic (e.g., chlorinated organic, phenolic compounds, surfactants, and herbicides) and inorganic (e.g., heavy metals, sulfides, and ammonia) chemicals present in the wastewater stream. This disruption of biological processes results in decreased carbon removal and modification of sludge compaction properties.

U.S Pat. No. 6,916,427 discloses an electrochemical method of purifying wastewater. The method includes the steps of running the wastewater as affluent into headwork where some preliminary treatment takes place. From there the fluent is passed into a primary reservoir. The primary reservoir analyzes the fluent as to certain control parameters such as pH, dissolved oxygen and/or dissolved solids. Thereafter the fluent flows into a primary reactor having a plurality of electrolytic cells therein. While in that reactor the fluent is subjected to electrical contacts which are located at the bottom and the top of the reactor. The effluent from the primary reactor passes through a ratio weir into a secondary receptor. The secondary receptor contains sensors for the measurement of control parameters such as pH, DO (dissolved oxygen) TDS (total dissolved solids) and chlorine. Thereafter, the fluent is passed to a filtering device. The overall purification system can be termed an electrolytic chemical system.

U.S. Pat. No. 5,989,428 discloses a method and apparatus for treating waste material to remove selected components form the waste is described using a reactor or a series of reactors in fluid communication with each other for receiving the waste to be treated as influent. The influent forms a biomass including the waste and microorganisms and is treated by controlling the metabolic activity of the microorganisms by monitoring the oxygen utilization rate or the potential oxygen utilization rate of the biomass so as to determine the required amount of oxygen to be supplied to the biomass and to determine the period of aeration of the biomass in order to maintain a predetermined oxygen utilization rate or value so as to remove the selected components of the waste.

WO 2008128032 A2 relates to wastewater treatment in general and to methods of controlling odors and degrading compounds contained in wastewater in particular by adding to the wastewater a wastewater composition comprising a strain of Mucor racemosus, Paecilomyces lilacinus, Asperfillus ustus or Trichoderma inhamatum.

US 20080047903 discloses a system and process for optimizing chemical additions, mixing energy, mixing time, and other variables while treating a contaminated liquid stream. Samples from the contaminated liquid stream are tested to determine the optimal parameter for each variable, including type and amount of the chemicals to be added, chemical sequence, mixing energy, mixing time, temperature, and pressurization. A system of mixers, a flotation chamber, and a dewatering subsystem are designed to achieve optimal turbidity of the wastewater stream. The system can be modified in real-time in response to a continually changing contaminated liquid stream via a controller and set of sensors, valves, and ports.

U.S. Pat. No. 9,475,714 discloses a method of treating wastewater in a wastewater treatment system. The wastewater treatment system receives an influent of the wastewater and having at least a first bioreactor and a second bioreactor each having therein bacteria for treating the waste material. The method comprises: monitoring a load parameter being indicative of a load on the second bioreactor; responsively to a monitored value of the load parameter, controlling at least one flow rate selected from the group consisting of (i) a flow rate from the influent to the second bioreactor through the first bioreactor, and (ii) a flow rate from the influent directly to the second bioreactor, so as to maintain a generally constant and predetermined load on the second bioreactor.

US 20080308493 discloses system and method for treating wastewater by continuously flowing wastewater into a chemostat and continuously discharging clean water out of the chemostat. The system can include sensors and an electronic controller for on-line measuring ambient parameters in the chemostat and adjusting the chemostat's operating conditions accordingly.

However, the methods known in the prior art requires energy intensive steps to recover the biological floc biomass and recycling. Other shortcomings such as disposal of waste sludge, very high biomass concentration of [mixed liquor suspended solids (MLSS)>3000 ppm] and the problem of most biomass remaining in the in inactive late log phase of growth cycle pose considerable challenges for effective solutions for bio-sludge reduction.

The inventors of the present application have developed an improved process for treatment of hydrocarbon refinery wastewater using specific microbial consortia, which produces a low bio-sludge to improve the overall efficiency of the process.

SUMMARY OF THE INVENTION

The present invention provides a process for hydrocarbon refinery wastewater treatment, producing a low bio-sludge.

The present invention further provides a process for hydrocarbon refinery wastewater treatment, producing a low bio-sludge and said process comprises utilizing microbial consortia comprising at least one species of *Pseudomonas* and at least one species of *Bacillus*.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein species of *Pseudomonas* and species of *Bacillus* have constitutive expression of at least one hydrocarbon degrading gene.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein the species of *Pseudomonas* are selected from the group consisting of *Pseudomonas stutzeri* (MTCC 25027), *Pseudomonas aeruginosa* (MTCC 5389 *Pseudomonas aeruginosa* strain IOC DHT (MTCC, 5385), *Pseudomonas putida* IOCR1 (MTCC 5387), *Pseudomonas putida* IOC5a1 (MTCC 5388) and a mutant thereof.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein the species of *Bacillus* are selected from the group consisting of *Bacillus subtilis* (MTCC 25026), *Bacillus substilis* (MTCC 5386), Bacillus thermoleovorans (MTCC 25023), *Bacillus stearothermophilus* (MTCC 25030), *Lysinibacillus* sp. (MTCC 25029), *Lysinibacillus* sp. (MTCC 5666) and a mutant thereof.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein the microbial consortia is used in concentration of at least $10^2$ cfu/ml.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein species of *Pseudomonas* and species of *Bacillus* have constitutive expression of at least one hydrocarbon degrading gene, wherein the species of *Pseudomonas* are selected from the group consisting of *Pseudomonas stutzeri* (MTCC 25027), *Pseudomonas aeruginosa* (MTCC 5389), *Pseudomonas aeruginosa* strain IOC DHT (MTCC, 5385), *Pseudomonas putida* IOCR1 (MTCC 5387), *Pseudomonas putida* IOC5a1 (MTCC 5388) and a mutant thereof, wherein the species of *Bacillus* are selected from the group consisting of *Bacillus subtilis* (MTCC 25026), *Bacillus substilis* (MTCC 5386), Bacillus thermoleovorans (MTCC 25023), *Bacillus stearothermophilus* (MTCC 25030), *Lysinibacillus* sp. (MTCC 25029), *Lysinibacillus* sp. (MTCC 5666) and a mutant thereof, and wherein the microbial consortia is used in concentration of at least $10^2$ cfu/ml.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein the microbes of the consortia works at low Mixed liquor suspended solids (MLSS) condition ranging from 700-1300 ppm.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein the microbe of the consortia has the ability to produce surface active molecules.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein the microbes of the consortia are grown at a temperature ranging from 5° C. to 50° C.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein the microbes of the consortia are grown at a pH ranging from 4.0 to 9.0.

The present invention further provides a process for hydrocarbon refinery wastewater treatment, producing a low bio-sludge and said process comprises utilizing microbial consortia comprising at least one species of *Pseudomonas* and at least one species of *Bacillus* in a ratio of 10:1 to 1:10, wherein hydrocarbon degrading gene is selected from the group consisting of: Phosphopanteteheinyl transferase (sfp, sfp0), Surfactin synthetase complex (srfAD), Rhamnosyltransferase subunit A (rh1A), Rhamnosyltransferase subunit B (rh1B), Lichenan-specific enzyme IIA component (licA), Lichenan-specific enzyme JIB component (licB), Lichenan-specific enzyme IIC component (licC), Catechol 1, 2 dioxygenase (CatA), Catechol dioxygenase (C12O, C23O), Catechol 2, 3 dioxygenase (xy1E), Naphthalene dioxygenase (nahH, nahI), Aromatic-ring hydroxylating dioxygenase (RHDα) Alkane monooxygenase (AlkB, AlkB1), Alkane dioxygenase (nahAc), n-alkane monooxygenase (CYP153), Long chain alkane monooxygenase (ladA), Flavin-binding monooxygenase (almA), Sulfide: quinone oxidoreductase (sqr), Persulfide dioxygenase (pdo), Chromate Reductase (ChrR) or a combination thereof.

DETAILED DESCRIPTION OF THE INVENTION

Figure 1:
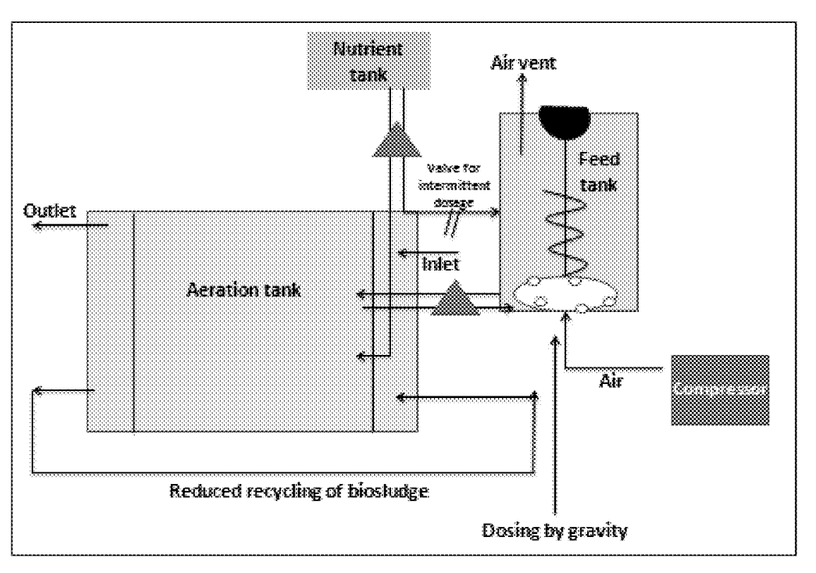
FIG. 1 illustrates a general scheme for treatment of hydrocarbon refinery wastewater using specific microbial consortia disclosed in present application.

While the invention is susceptible to various modifications and/or alternative processes and/or solvent system, specific embodiment thereof has been shown by way of examples and will be described in detail below. It should be understood, however that it is not intended to limit the invention to the particular processes and/or temperature, pH, ratios, quantity and strains disclosed, but on the contrary, the invention is to cover all modifications, equivalents, and alternative falling within the spirit and the scope of the invention as defined by the appended claims.

The figures and protocols have been represented where appropriate by conventional representations, showing only those specific details that are pertinent to understanding of the embodiments of the present invention and not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Any particulars and all details set forth herein are used in the context of some embodiments and therefore should not be necessarily taken as limiting factors to the attached claims. The attached claims and their legal equivalents can be realized in the context of embodiments other than the ones used as illustrative examples in the description below.

The present invention discloses a hydrocarbon refinery wastewater bio-treatment process and more specifically to a process for bio-sludge reduction in effluent treatment plant (ETP) aeration tank through microbial intervention.

In accordance with the present invention a microbial consortia of hydrophilic petroleum hydrocarbon degrading bacterium was prepared. The member used of consortia can be individually-immobilized using artificial inorganic shells, based on methods reported in the literature or as such i.e., free without immobilization.

These microbes as such or after appropriate surface modification can act as an effective bacteria-based emulsifier and/or degrader. When compared to unmodified bacterial cells, these individually-immobilized microbes may act as an effective emulsifier to adsorb at the oil-water interface and then facilitate the biodegradation of oil. This is very desirable for bioremediation of waste water.

The main object of the present invention is to develop a high cell density novel formulation of microbial consortium having following characteristics like, degradation of aromatics, polyaromatics, hetrocyclic polyaromatics, aliphatics, benzene, toluene, ethylbenzene and xylene (BTEX), paraffin, phenolics, sulfides, production of biosurfactants, reduction of toxic metals like hexavalent chromium to non-toxic states, tolerance to hydrocarbon loads. Beside that each microbes should be catalase positive, lipase positive and indole positive.

In accordance with the present invention, each of the microbes in the consortium should contain at least one gene encoding the enzyme/protein/compound responsible for of the above characteristics. Further, each microbe of the consortium should have less expression or should not have expression of the genes responsible for producing exopolysaccharides that cause flocculation.

It is the object of the present invention, that at least one member of microbial consortia disclosed in present invention should have good expression of at least one gene among Lichenan-specific enzyme IIA component (licA), Lichenan-specific enzyme JIB component (licB), Lichenan-specific enzyme IIC component (licC), n-Phosphopantetheinyl transferase (sfp, sfp0), Rhamnosyltransferase subunit A (rh1A), Rhamnosyltransferase subunit B (rh1B), Surfactin synthetase complex (srfAD) for producing biosurfactant/dispersant/surface active molecules. The bacterium included in the present invention should have more than 99% similarity with one of the sequence of SEQ. ID No. 1-4.

The primers and PCR conditions to be used for identifying the gene sequences of SEQ. ID No.1-4 are as follows:

```
F 5'-CGTTCGCTCAGTCATAAGCA-3'

R 5'-CCTGTATGCACACCCATCTG-3'

F 5'GCCCACGACCAGTTCGAC-3'

R 5'CATCCCCCTCCCTATGAC-3'

F 5'-TCCGTTTTTCCTTGTTCACC-3'

R 5'-TCTTTCTGCCACTGCATCAC-3'

F 5'AGGCAAGCAAGCCTCTGGCG-3'

R 5'CTTGTCCGCACAGGCACCGT-3'
```

The PCR conditions to be used to verify the expression of genes of SEQ. ID No.1-4 are as follows: Initial melting at 94° C. for 5 min, then 35 repeated cycles of holding at 94° C. for 25 sec as denaturation, 54° C. for 40 seconds as annealing and extension at 72° C. for 50 seconds, followed by the final elongation by holding the reaction for 6 minutes at 72° C.

It is the object of the present invention, that at least one member of microbial consortia disclosed in present invention should have good expression of at least one gene among Catechol 1, 2 dioxygenase (CatA), Catechol dioxygenase (C12O, C23O), Naphthalene dioxygenase (nahH, nahI) for degrading the poly aromatics/phenolics/heterocyclics. The bacterium included in the present invention should have more than 99% similarity with one of the sequence of SEQ. ID No. 5-6.

The primers and PCR conditions to be used for identifying the gene sequence of SEQ. ID No. 5-6 are as follows:

```
F-5'TGGCGATGAAGAACTTTTCC-3'

R-5'AACGTACGCTGAACCGAGTC-3'

F-5'AAGAGGCATGGGGGCGCACCGGTTCGA-3'

R-5'TCACCAGCAAACACCTCGTTGCGGTTGCC-3'
```

The PCR conditions to be used to verify the expression of genes of SEQ. ID No.5-6 are as follows: Initial melting at 94° C. for 5 min, then 35 repeated cycles of holding at 94° C. for 25 seconds as denaturation, 54° C. for 40 seconds as annealing and extension at 72° C. for 50 seconds, followed by the final elongation by holding the reaction for 6 minutes at 72° C.

The microbial consortia disclosed in present invention should have good expression of at least one gene among aromatic ring hydroxylating (RHD) genes for breakdown of aromatic rings. The gene expression should match 90-100% with one of the sequence of SEQ. ID No. 7-8.

The primers and PCR Conditions to be used for identifying the gene sequence of SEQ. ID No. 7-8 are as follows:

F-5'CGGCGCCGACAAYTTYGTNGG-3'

R-5'GGGGAACACGGTGCCRTGDATRAA-3'

The PCR conditions to be used to verify the expression of genes of SEQ. ID No.7-8 are as follows: Initial melting at 94° C. for 5 min, then 35 repeated cycles of holding at 94° C. for 25 seconds as denaturation, 54° C. for 40 seconds as annealing and extension at 72° C. for 50 seconds, followed by the final elongation by holding the reaction for 6 minutes at 72° C.

The microbial consortia disclosed in present invention should have good expression of at least one gene among Alkane monooxygenase (AlkB, AlkB1), Alkane dioxygenase (nahAc), Flavin-binding monooxygenase (almA), Long chain alkane monooxygenase (ladA) for degrading aliphatics like n-alkanes, long-chain alkanes, paraffins, etc. The gene expression should match 100% with one of the sequence of SEQ. ID No. 9-11.

The primers and PCR conditions to be used for identifying the gene sequence of SEQ. ID No. 10-11 are as follows:

F-5'AACTACMTCGARCAYTACGG-3'

R-5'TGAMGATGTGGTYRCTGTTCC3'

F-5'TACGGGCACTTCGCGATTGA-3'

R-5'CGCCCAGTTCGAMACGATGTG-3'

The PCR conditions to be used to verify the expression of genes of SEQ. ID No.10-11 are as follows: Initial melting at 94° C. for 5 minutes, then 35 repeated cycles of holding at 94° C. for 25 seconds as denaturation, 54° C. for 40 seconds as annealing and extension at 72° C. for 50 seconds, followed by the final elongation by holding the reaction for 6 minutes at 72° C.

The microbial consortia disclosed in present invention should have good expression of at least one gene among quinone oxidoreductase (sqr), Persulfide dioxygenase (pdo), for sulfide removal. The microbial consortia disclosed in present invention should have good expression of Catechol 2, 3 dioxygenase (xy1E) gene responsible for BTEX degradation. The microbial consortia disclosed in present invention should have good expression of at least one gene among Chromate Reductase (ChrR) for chromium reduction.

Further, the microbial consortia disclosed in present invention should not have expression of any gene among Transcriptional activator protein (flcA, LuxR/UhpA) genes for suppressing the exopolysaccharides production/flocculation. The gene expression should match 99% with the sequence of SEQ. ID No. 12-15.

The primers and PCR conditions to be used for identifying the gene sequence of SEQ. ID No. 12-15 are as follows:

F-5'TACGGGCACTTCGCGATTGA-3'

R-5'CGCCCAGTTCGAMACGATGTG-3'

The PCR conditions to be used to verify the expression of genes of SEQ. ID No. 12-15 are as follows: Initial melting at 94° C. for 5minutes, then 35 repeated cycles of holding at 94° C. for 25 seconds as denaturation, 54° C. for 40 seconds as annealing and extension at 72° C. for 50 seconds, followed by the final elongation by holding the reaction for 6 minutes at 72° C.

In an embodiment, a wastewater treatment system includes a reactor comprising a wastewater input, a bacteria input, a nutrients input, an oxygen input. In another embodiment the method of treating wastewater comprises the steps of:
i. continuously flowing wastewater into a reactor;
ii. continuously dosing microbes in log phase; and
iii. continuously discharging clean water out of the reactor.

In an embodiment of the said process includes a wastewater input, bacteria and nutrients input, an oxygen input, and a clean water output. In another embodiment, the said wastewater bio-treatment process runs at a mixed liquor suspended solids (MLSS) concentration of 1000 mg/L. In yet another embodiment the said wastewater bio-treatment process does not require recycling of the biomass to the aeration tank.

In a further embodiment of the present invention, the bio-sludge production is at least 50% less than conventional activated sludge process. In yet another embodiment, the retention time of the bacteria in the aeration tank is 4-16 hours. The microbial consortia used in the present invention dose is tolerant to shock loads and does not requires the recycling of the biomass, hence, upset can be managed effectively.

In an embodiment of the present invention, the ratio of Pseudomonas sp. to Bacillus on a biomass basis, is desirably from about 10:1 to about 1:10, preferably from about 5:1 to about 1:5, and most preferably from about 2:1 to 1:2.

The microbial consortia disclosed in present invention may include at least one Pseudomonas species and one Bacillus species. Species of Pseudomonas are selected from the group consisting of Pseudomonas stutzeri (MTCC 25027), Pseudomonas aeruginosa (MTCC 5389), Pseudomonas aeruginosa strain IOC DHT (MTCC, 5385), Pseudomonas putida IOCR1 (MTCC 5387), Pseudomonas putida IOC5a1 (MTCC 5388) and a mutant of any one of said microbes possessing all the identifying characteristics of any one of said microbes, and mixtures thereof.

Species of Bacillus are selected from the group consisting of Bacillus subtilis (MTCC 25026), Bacillus substilis (MTCC 5386), Bacillus thermoleovorans (MTCC 25023), Bacillus stearothermophilus (MTCC 25030), Lysinibacillus sp. (MTCC 25029), Lysinibacillus sp. (MTCC 5666) and a mutant of any one of said microbes possessing all the identifying characteristics of any one of said microbes, and mixtures thereof.

The microbial consortia disclosed in present invention may include at least one Pseudomonas and one Bacillus where at least one microbe has ability to produce surface active molecule. The microbes disclosed in the present application have constitutive expression of various hydrocarbon degrading genes and at least one microbe has ability to produce dispersant/surface active molecules.

The microbial consortium of the invention has been found to be highly effective for rapidly metabolizing and eliminating a wide variety of hydrocarbons. The mixed culture and methods of the invention have the additional advantage of being totally innocuous to the environment. The bacteria and nutrients have no adverse effect on the ecosystem either during or after the bio-treatment process. The bacteria generally die, or at least their population is reduced to a minuscule level, after the hydrocarbons in the system are consumed. The hydrocarbon contaminants are completely mineralized by the mixed bacteria culture of the invention, under aerobic conditions, yielding harmless products (e.g. carbon dioxide, water, biomass and salts).

In accordance with another aspect of the current invention, all the microbes were selected for stress tolerance. The stress factors included were acidity, alkalinity, high temperature and low temperature. These strains show growth profile under broad range of temperature (5° C. to 40° C.) and pH (4.0 to 9.0).

A suitable nutrient system used in the process is disclosed comprising a nitrogen source, such as an ammonium salt, and a phosphorus source, such as an alkali metal phosphate compound. The nutrient system desirably includes a magnesium source, such as a magnesium salt, and can optionally include other nutrients such as sodium, calcium and iron salts.

For growth of microbes in the tank at inlet of the aeration tank, the foregoing nutrients are dissolved in a suitable amount of water to dissolve the nutrients and combined with appropriate quantities of a suitable initial primary food source and the mixed bacteria culture. A suitable initial primary food source is generally organic sugar and/or any aliphatic or mononuclear aromatic hydrocarbon. The improvement provided by the present invention involves a controlled-release source of microbial nutrients at a low level and optionally vitamins and/or nutrients which double as buffering agents to keep the surrounding environment of the product at a pH which is compatible with the growth and activity of the particular microbes.

In accordance with the present invention, a method for isolating a useful microbial consortium comprises the steps of:

Isolating the bacterium.
developing of an synergistic mixture

According to the method of the present application the reactor is a continuously stirred reactor. According to the method of present application the reactor is working when DO is at least 3 ppm. According to the method of present application, the method is workable when the microbial count of the introduced microbe is at least $10^2$ cfu/ml.

The method of present application leads to reduction in: chemical oxygen demand (COD), total petroleum hydrocarbons (TPH), biochemical oxygen demand (BOD), total organic carbon (TOC), total suspended solids (TSS), sulfide, phenol, poly aromatic hydrocarbons (PAH), volatile suspended solids (VSS), total carbon (TC), total inorganic carbon (TIC), oil and grease content of the input wastewater. According to the method of present application, at least one of the first bioreactor and the second bioreactor is at aerobic conditions.

Having described the basic aspects of the present invention, the following non-limiting examples illustrate specific embodiment thereof.

Example-1

Microbial consortium comprising of the aforesaid characteristics was prepared using *Pseudomonas stutzferi* (MTCC 25027), *Bacillus subtilis* (MTCC 25026) *Bacillus substilis* (MTCC 5386), *Pseudomonas aeruginosa* (MTCC 5389), *Lysinibacillus* sp. (MTCC 5666), *Lysinibacillus* sp. (MTCC 25029) are used as example.

The said microbial blend has a very good expression of Surfactin synthetase complex (srfAD) and Phosphopantetheinyl transferase (sfp) genes for producing biosurfactants called, surfactin. The consortium also has good expression of Catechol 1, 2 dioxygenase (catA), Naphthalene dioxygenase (nahH), Alkane monooxygenase (alkB and alkB1) genes for degrading the aromatics and aliphatics respectively. The consortium also has very good expression of Long chain alkane monooxygenase (ladA) for degrading the long chain alkanes/paraffins. The consortium also has a good expression of Persulfide dioxygenase (pdo) gene, Catechol 2, 3 dioxygenase (xylE) and Chromate Reductase (chrR) genes for sulfide removal, BTEX degradation and chromium reduction. The consortium has very weak expression of Transcriptional activator protein (flcA) gene responsible for flocculation.

The microbial consortia were evaluated to decontaminate the refinery wastewater in a continuous CSTR. The performance of the consortia was compared with activated sludge obtained from the refinery. The performance comparison is as follows:

| | | Outlet | | |
|---|---|---|---|---|
| Parameter | Inlet | Activated sludge | Microbial consortia of present invention | Microbial consortia disclosed in WO 2014/033638 A2 |
| Oil & Grease (ppm) | 555 | 08.7 | 04.1 | 5.0 |
| Phenol (ppm) | 12 | 1.23 | 0.26 | 0.30 |
| Sulphide (ppm) | 23 | 1.74 | 0.25 | 0.30 |
| MLSS (ppm) | | 3546 | 980 | 4500 |
| Bio-sludge generation in treating 100 L water (g, dry weight) | | 7.69 | 0.98 | 6.17 |

Example-2

The microbial consortia consisting of *Bacillus subtilis* (MTCC 25026) *Bacillus substilis* (MTCC 5386), *Pseudomonas aeruginosa* (MTCC 5389), *Bacillus stearothermophilus* (MTCC 25030), *Lysinibacillus* sp. (MTCC 5666), were evaluated to decontaminate the refinery wastewater in a continuous CSTR. The microbial count was maintained at $10^2$ cfu/ml. The ratio of *Pseudomonas* and *Bacillus* was maintained 2:10. The performance of the consortia was compared with activated sludge obtained from the refinery. The performance comparison is as follows:

| | | After treatment | |
|---|---|---|---|
| Parameter | Before treatment | Activated sludge | Microbial consortia disclosed in this invention |
| O&G (ppm) | 555 | 08.7 | 3.95 |
| Phenol (ppm) | 12 | 1.23 | 0.22 |
| Sulphide (ppm) | 23 | 1.74 | 0.28 |
| MLSS (ppm) | | 3546 | 1030 |
| Bio-sludge generation in treating 100 L water (g, dry weight) | | 7.69 | 1.16 |

Example-:3

The microbial consortia consisting of *Pseudomonas stutzferi* (MTCC 25027) *Bacillus subtilis* (MTCC 25026) *Lysinibacillus* sp. (MTCC 5666), *Pseudomonas putida* IOCR1 (MTCC 5387), *Lysinibacillus* sp. (MTCC 25029) were evaluated to decontaminate the refinery wastewater in a continuous CSTR. The microbial count was maintained at $10^4$ cfu/ml. The ratio of *Pseudomonas* and *Bacillus* was maintained 1:10. The performance of the consortia was compared with activated sludge obtained from the refinery. The performance comparison is as follows:

| Parameter | Inlet | After treatment | |
|---|---|---|---|
| | | Activated sludge | Microbial consortia disclosed in this invention |
| O&G (ppm) | 555 | 08.7 | 1.2 |
| Phenol (ppm) | 12 | 1.23 | 0.09 |
| Sulphide (ppm) | 23 | 1.74 | 0.06 |
| MLSS (ppm) | 3546 | 720 | |
| Bio-sludge generation in treating 100 L water (g, dry weight) | | 7.69 | 0.86 |

The invention claimed is:

1. A process for hydrocarbon refinery wastewater treatment for producing low bio-sludge, the process comprising utilizing an immobilized microbial consortia comprising species of *Pseudomonas* and species of *Bacillus* in a ratio of 10:1 to 1:10, wherein the microbial consortia comprises *Pseudomonas stutzeri* (MTCC 25027), *Bacillus subtilis* (MTCC 25026), *Lysinibacillus* sp. (MTCC 5666), *Pseudomonas putida* IOCR1 (MTCC 5387) and *Lysinibacillus* sp. (MTCC 25029), and wherein the microbial consortia is used in concentration of at least $10^2$ cfu/ml.

2. The process as claimed in claim 1, wherein the treated hydrocarbon refinery wastewater comprises mixed liquor suspended solids (MLSS) ranging from 700-1300 ppm.

3. The process as claimed in claim 1, wherein the process is carried out at a temperature ranging from 5° C. to 50° C.

4. The process as claimed in claim 1, wherein the process is carried out at a pH ranging from 4.0 to 9.0.

5. The process as claimed in claim 1, wherein the microbial consortia expresses at least one hydrocarbon degrading gene selected from the group consisting of: Phosphopantetheinyl transferase (sfp, sfp0), Surfactin synthetase complex (srfAD), Rhamnosyltransferase subunit A (rh1A), Rhamnosyltransferase subunit B (rh1B), Lichenan-specific enzyme IIA component (licA), Lichenan-specific enzyme IIB component (licB), Lichenanspecific enzyme IIC component (licC), Catechol 1, 2 dioxygenase (CatA), Catechol dioxygenase (C12O, C23O), Catechol 2, 3 dioxygenase (xylE), Naphthalene dioxygenase (nahH, nahI), Aromatic-ring hydroxylating dioxygenase (RHDα), Alkane monooxygenase (AlkB, AlkB1), Alkane dioxygenase (nahAc), n-alkane monooxygenase (CYP153), Long chain alkane monooxygenase (ladA), Flavin-binding monooxygenase (almA), Sulfide: quinone oxidoreductase (sqr), Persulfide dioxygenase (pdo), Chromate Reductase (ChrR) or a combination thereof.

\* \* \* \* \*